United States Patent [19]

Van Howard

[11] Patent Number: 4,625,414

[45] Date of Patent: Dec. 2, 1986

[54] WELDING RING GAUGE

[76] Inventor: Johnny Van Howard, P.O. Box 333, 3149 Fairburn Rd., Douglasville, Ga. 30133

[21] Appl. No.: 696,500

[22] Filed: Jan. 22, 1985

[51] Int. Cl.⁴ .............................................. G01B 5/25
[52] U.S. Cl. .................................... 33/180 R; 33/427; 33/452; 33/529
[58] Field of Search ...................... 33/169 R, 427, 452, 33/454, 455, 464, 470, 529, 169 D, 180 R

[56] References Cited

U.S. PATENT DOCUMENTS 752,823  2/1904  Cary ........................................ 33/427
4,388,765  6/1983  Dearman ............................... 33/427

Primary Examiner—Willis Little
Attorney, Agent, or Firm—B. J. Powell

[57] ABSTRACT

A welding gauge for an insert ring on the end of a pipe with a first slide member defining a pipe engaging gauging surface and with a second slide member slidably mounted on a first slide member along a path perpendicular to the path of the gauging surface. The second slide member has a ring engaging recess which projects out over the gauging surface to hold the welding ring in place on the end of a pipe. The slide members can be locked together in any position for adjustment.

4 Claims, 5 Drawing Figures

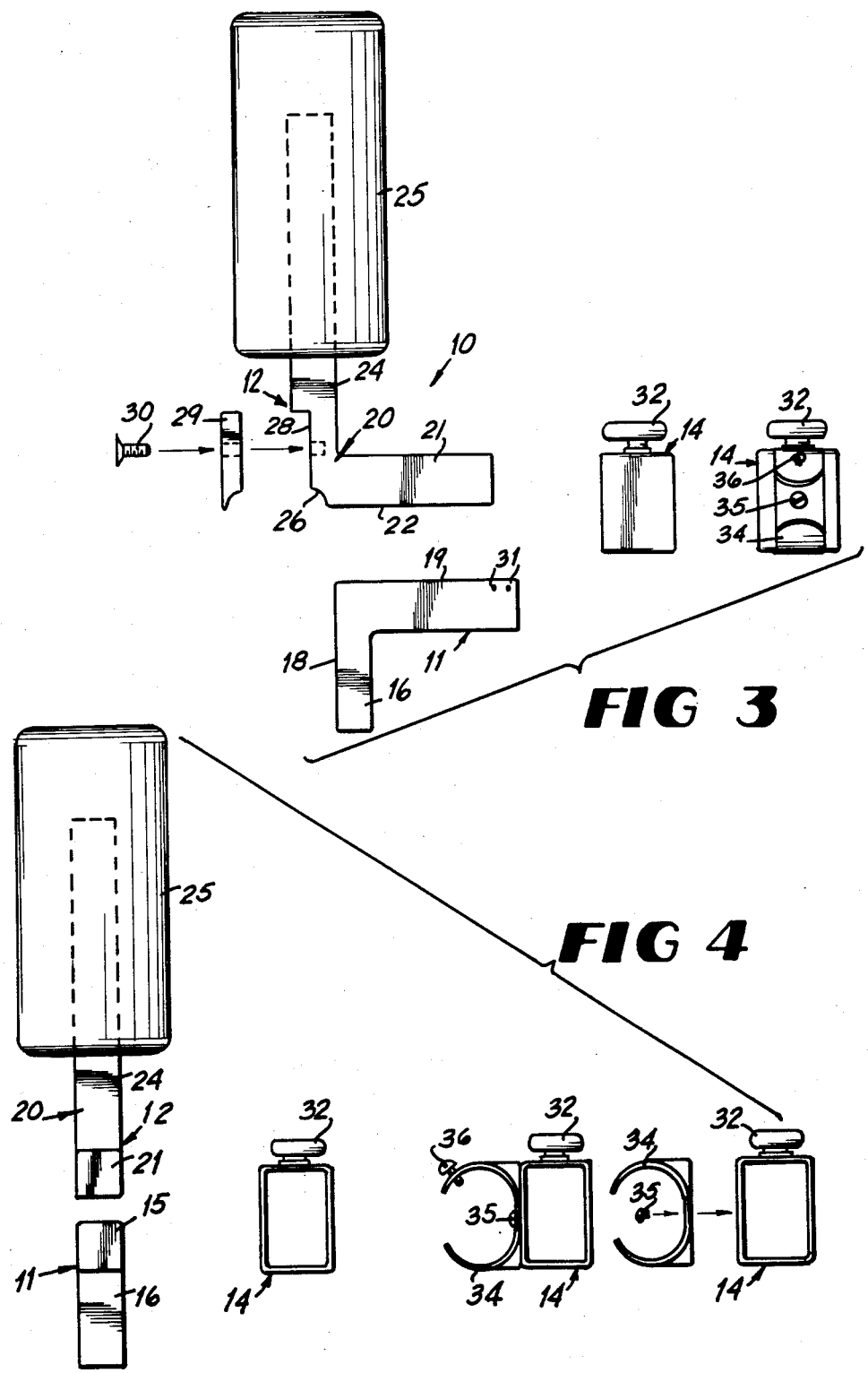

WELDING RING GAUGE

BACKGROUND OF THE INVENTION

This invention relates generally to holding gauges for use in the welding trade and more particularly to a holding gauge for locating and holding an insert ring on the beveled end of a pipe while it is tack welded in place.

Pipes which are butt welded end-to-end typically are beveled so that the weld metal fills the groove formed by the bevels when the pipes abut. More recently, a consumable insert ring is placed between the pipes when they are placed end-to-end and this ring is consumed as the joint is welded to become part of the weld metal connecting the two pipes. The location of this insert ring on the bevels between the two pipes is critical in order for the resulting weld to pass inspection for high pressure use. To hold the ring in place while the final weld is made, the ring is initially tack welded at several places around the bevel on one of the pipes. Once the ring is tack welded into place, the other pipe is placed in position and the final weld is completed. There has not been any device heretofore which permits the insert ring to be accurately located on the bevel of a pipe while it is being tack welded in position.

SUMMARY OF THE INVENTION

These and other problems and disadvantages associated with the prior art are overcome by the invention disclosed herein by providing a gauge which has the capability of accurately locating the insert ring on the bevel on the end of a pipe and to positively hold the ring in position on the bevel while it is being tack welded into place. As a result, less time is required by the welder to locate and hold the insert ring and the weld produced is of uniform quality.

The invention is incorporated in a gauge which has a first slide member that defines a gauging surface thereon. The gauging surface is adapted to abut the inside of a pipe adjacent its end to locate the first slide member on the pipe. A second slide member is slidably mounted on the first slide member for movement generally normal to the gauging surface so that a portion of the second slide member can project out over the beveled end of the pipe when the first slide member is abutting the inside surface of the pipe. That portion of the second slide member which projects over the end of the pipe is provided with a holding recess that will engage the insert ring to locate it on the bevel on the pipe. The second slide member is equipped with a handle that can be manually grasped and is oriented so that the force exerted on the handle will be directed on the insert ring generally coaxial with the length of the side wall of the pipe. Locking means is provided for adjustably affixing the first and second slide members with respect to each other so that the distance that the recess is located from the gauging surface can be changed to permit the insert ring to be located in different positions along the surface of the bevel. Locking means is also provided with a holder to hold accessories that may be used in tack welding the ring to the bevel on the pipe such as a purge lense to keep the welding area purged of air during the welding process.

These and other features and advantages of the invention disclosed herein will become more apparent upon consideration of the following detailed description and accompanying drawings wherein like characters of reference designate corresponding parts throughout the several views and in which:

BRIEF DESCRIPTION OF THE DRAWINGS

FIG. 3 is an exploded side elevational side thereof;
FIG. 4 is an exploded end view thereof.

Figure 1:
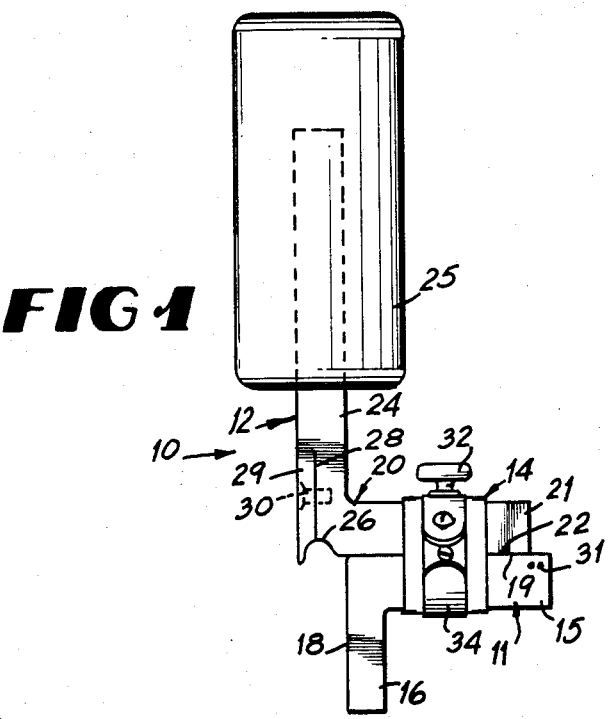
FIG. 1 is a side view illustrating the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the drawings, it will be seen that the invention is incorporated in a gauge 10. The gauge 10 includes a first slide member 11 which slidably mounts a slide assembly 12 thereon. A locking component 14 is provided which can selectively fix the first slide member and slide assembly relative to each other so that the gauge 10 can be used to locate a welding insert ring as will become more apparent.

The first slide member 11 is abutted against the side of the pipe adjacent the end thereof while the slide assembly 12 is adjusted relative to the first slide member 11 so that it overlies the bevel on the end of the pipe. The workman can then hold the insert ring in position on the bevel as will become more apparent.

The first slide member 11 is an L-shaped member with a slide leg 15 connected at one end to a gauging leg 16 integral with the slide leg 15 and projecting outwardly from the slide leg 15 generally perpendicular thereto. A gauging surface 18 is defined along the projecting side edge of the gauging leg 16. The gauging surface 18 is designed to rest against the inside surface of the pipe wall so as to locate the gauge 10 with respect to the pipe. In use, the gauging leg 16 is located so that it is generally parallel to the centerline of the pipe. This places the slide leg 15 so that it is generally perpendicular to the centerline of the pipe. The outwardly projecting edge of the slide leg 15 defines a slide surface 19 thereon oriented perpendicular to the gauging surface 18 and adapted to slidably support the slide assembly 12 as will become more apparent.

The slide assembly 12 includes a second slide member 20 which is also L-shaped. Slide member 20 has a slide leg 21 corresponding generally to the slide leg 15 on the first slide member 11. The slide leg 21 defines a slide surface 22 which cooperates with the slide surface 19 on the first slide member 11 so that the first and second slide members can slide with respect to each other. This causes the second slide member to move along the path perpendicular to the gauging surface 18. The second slide member 20 also has a handle leg 24 integral with that end of the slide leg 21 in the vicinity of the gauging leg 16 and projects outwardly from the slide leg 21 in a direction opposite to the direction in which the gauging leg 16 extends from the slide leg 15 on the first slide member 11. The outer projecting end of the handle leg 24 mounts a handle 25 thereon. The outer projecting corner of the juncture between slide leg 21 and handle leg 24 is provided with a ring recess 26 which opens onto the slide surface 22. A cutout 28 is provided along the outwardly facing side edge of the handle leg 24 which opens into the ring recess 26. The insert recess 28 is designed to receive a replaceable insert 29 therein with the projecting end of the insert 29 adjacent the ring recess 26 forming a continuation thereof so that the ring recess 26 is completed by the insert 29 and has a generally semi-circular shape as best seen in FIG. 1.

An attachment screw 30 passes through the insert 29 and is threaded into the handle leg 24 to hold the insert in place in use. Because the welding takes place close to this portion of the gauge, it is necessary to periodically replace the insert 29 as the end of the insert 29 is burned away.

From FIG. 1, it will be seen that the ring recess 26 can be shifted toward and away from the gauging surface 18 along a path of movement perpendicular to the gauging surface 18. The size and shape of the ring recess 26 is selected to conform to the cross-sectional shape of the insert ring being tack welded onto the bevel of the pipe. A pair of indicator dots 31 are illustrated in FIG. 1 on the slide leg 15 adjacent the slide surface 19 thereon. These indicator dots 31 are located so that the insert ring is located in different positions on the end of the pipe by moving the projecting end of the second slide member 20 so that it lines up with a selected one of the dots.

Figure 2:
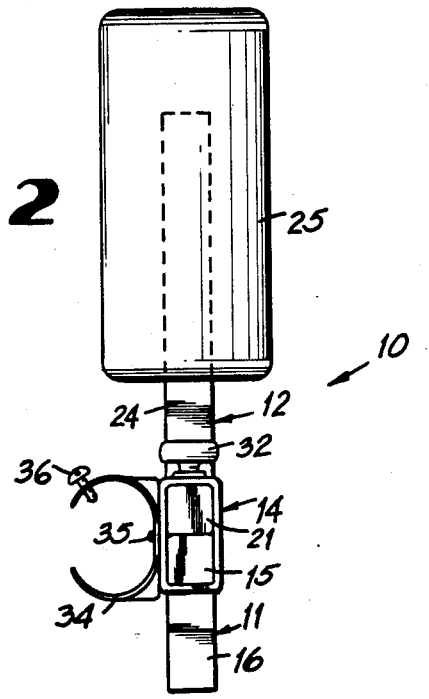
FIG. 2 is a right end view thereof.
Figure 5:
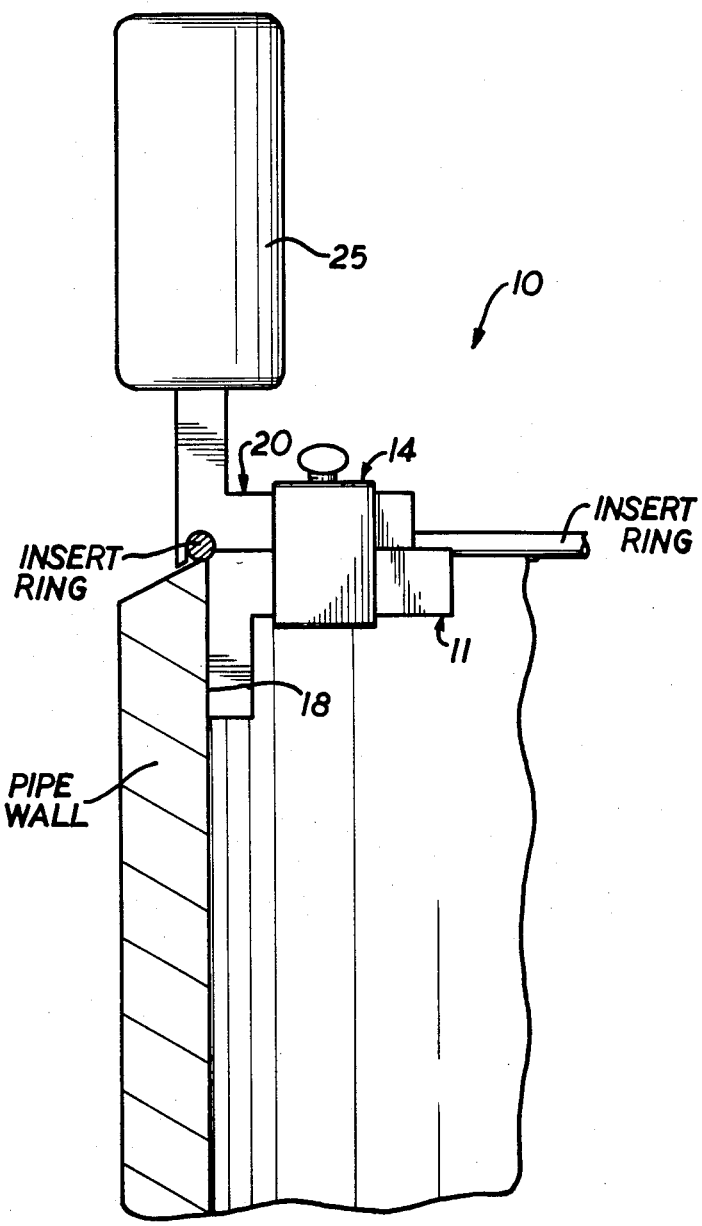
FIG. 5 is a view showing the tool in use.

The locking component 14 is a tubular member defining a passage therethrough with a cross-sectional shape and size to just slidably receive the two slide legs 15 and 21 of the slide members 11 and 20 therethrough as best seen in FIG. 2. This holds the two slide members coplanar with each other as they slide back and forth with respect to each other. A locking screw 32 is threaded through the locking component 14 to engage the slide leg 21 on the second slide member 20 as best seen in FIGS. 1 and 2 so that the two slide members can be locked with respect to each other as the screw is tightened. Loosening the screw permits the slide members to again be adjusted with respect to each other.

When it is desirable to use a purge lense with the gauge, a clip member 34 is provided which can be attached to the side of the locking component 14 as best illustrated in FIG. 4 using attachment screw 35. The clip member 24 has an opening through it so that the purge lense can be inserted therein and adjusted to a desired position relative to the ring holding recess 26 in the slide assembly 12. A locking screw 36 is provided for locking the purge lense in place in the clip during use.

I claim:

1. A gauge to locate and hold a pipe insert ring in place on the bevel on the end of a pipe so that the ring can be tack welded to the pipe comprising:

a first slide member defining a gauging surface thereon adapted to abut the inside of a pipe adjacent the end thereof and locate said gauge with respect to the pipe;

a second slide member slidably mounted on said first slide member for movement generally normal to said gauging surface, said second slide member having a holding portion thereof adapted to adjustably project past said gauging surface so as to overlie the bevel on the end of the pipe when said gauging surface abuts the inside of the pipe, said holding portion defining a holding recess therein adapted to engage the insert ring and locate the insert ring on the end of the pipe; and locking means for selectively fixing said second slide member with respect to said first slide member to locate said holding recess with respect to said gauging surface.

2. The gauge of claim 1 further including a manually engageable handle connected to said second slide member with a longitudinal axis passing generally through said holding recess and oriented generally parallel to said gauging surface.

3. The gauge of claim 2 wherein said second slide member defines a cutout therein opening into said holding recess and further including an insert receivable in said cutout and forming a continuation of said recess.

4. The gauge of claim 3 further including indicia operatively associating the position of said second slide member relative to said first slide member so that the position of said holding recess relative to said gauging surface can be quantified.

* * * * *